(12) United States Patent
Baldemair et al.

(10) Patent No.: US 11,233,615 B2
(45) Date of Patent: Jan. 25, 2022

(54) HANDLING SOUNDING REFERENCE SIGNALING

(71) Applicant: Telefonaktiebolaget LM Ericsson (publ), Stockholm (SE)

(72) Inventors: Robert Baldemair, Solna (SE); Stephen Grant, Pleasanton, CA (US); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/430,963

(22) Filed: Jun. 4, 2019

(65) Prior Publication Data

US 2019/0288808 A1 Sep. 19, 2019

Related U.S. Application Data

(63) Continuation of application No. PCT/SE2017/050801, filed on Aug. 4, 2017.

(51) Int. Cl.
*H04L 5/00* (2006.01)
*H04W 72/04* (2009.01)
*H04W 72/12* (2009.01)

(52) U.S. Cl.
CPC ............ *H04L 5/005* (2013.01); *H04L 5/0051* (2013.01); *H04L 5/0053* (2013.01); *H04W 72/0413* (2013.01); *H04W 72/0446* (2013.01); *H04W 72/1263* (2013.01); *H04L 5/001* (2013.01); *H04W 72/0453* (2013.01)

(58) Field of Classification Search
CPC .............. H04L 5/005; H04W 72/0413; H04W 72/0446; H04W 72/1263; H04W 72/0453
See application file for complete search history.

(56) References Cited

U.S. PATENT DOCUMENTS

| | | | | |
|---|---|---|---|---|
| 2011/0038271 A1* | 2/2011 | Shin | ...................... | H04W 52/08 370/252 |
| 2011/0199944 A1* | 8/2011 | Chen | .................... | H04L 5/0007 370/280 |
| 2012/0113967 A1* | 5/2012 | Smith | .................. | H04B 1/7143 370/338 |
| 2013/0242911 A1* | 9/2013 | Heo | ........................ | H04L 5/001 370/329 |
| 2014/0010182 A1* | 1/2014 | Chunli | .................. | H04L 5/0048 370/329 |
| 2015/0372792 A1* | 12/2015 | Damnjanovic | ..... | H04W 52/346 370/329 |

(Continued)

*Primary Examiner* — Jeffrey M Rutkowski
*Assistant Examiner* — Jasper Kwoh
(74) *Attorney, Agent, or Firm* — Murphy, Bilak & Homiller, PLLC

(57) ABSTRACT

There is described a method of operating a user equipment in a radio access network. The method comprises transmitting signaling based on a sounding reference signaling schedule, the sounding reference signaling schedule scheduling transmission of sounding reference signaling in a first time interval, wherein the first time interval overlaps, in an overlap time interval, with a second time interval, for which physical channel signaling is scheduled, wherein transmitting signaling comprises transmitting, in the overlap time interval, the physical channel signaling omitting the scheduled sounding reference signaling. The disclosure also pertains to related devices and methods.

16 Claims, 6 Drawing Sheets

(56) References Cited

U.S. PATENT DOCUMENTS

| | | | |
|---|---|---|---|
| 2017/0215198 A1* | 7/2017 | Chen | H04W 72/1205 |
| 2017/0222856 A1 | 8/2017 | Dinan | |
| 2017/0302419 A1* | 10/2017 | Liu | H04L 5/0082 |
| 2018/0132229 A1* | 5/2018 | Li | H04L 1/0013 |
| 2019/0159134 A1* | 5/2019 | Wang | H04W 16/14 |
| 2019/0386764 A1* | 12/2019 | Choi | H04L 5/0051 |
| 2020/0092055 A1* | 3/2020 | Choi | H04L 5/00 |

* cited by examiner a)

b)

HANDLING SOUNDING REFERENCE SIGNALING

RELATED APPLICATIONS

The present application is a continuation of international patent application serial no. PCT/SE2017/050801, filed on 4 Aug. 2017, the entire contents of which is incorporated herein by reference.

TECHNICAL FIELD

This disclosure pertains to wireless communication technology, in particular in the context of radio access technology/networks (RAT/RAN), for example 5G technology like New Radio (NR) or LTE Evolution according to 3GPP.

BACKGROUND

With the introduction of new techniques into wireless communication, knowing the channel conditions on short timescales becomes more and more important, in particular in the context of high carrier frequencies (e.g., 3 GHz or higher), low latency operations or highly beamformed communication, all of which are to be implemented for example in NR. Channel conditions may be suitable determined based on sounding reference signaling (pilot signaling transmitted in uplink), e.g. for reciprocity-based operations. However, with increased use of such reference signaling, approaches are needed to handle scenarios in which schedules of sounding reference signaling and other signaling might collide or produce undesirable side effects.

SUMMARY

It is an object of this disclosure to provide approaches allowing improved handling of schedules of sounding reference signaling, in particular to avoid unwanted interference between sounding reference signaling and other signaling, while still facilitating efficient sounding of channel conditions. The approaches are particularly advantageously implemented in a 5th Generation (5G) telecommunication network or 5G radio access technology or network (RAT/RAN), in particular according to 3GPP (3rd Generation Partnership Project, a standardisation organization). A suitable RAN may in particular be a RAN according to NR, for example release 15 or later, or LTE Evolution.

There is disclosed a method of operating a user equipment in a radio access network. The method comprises transmitting signaling based on a sounding reference signaling schedule, the sounding reference signaling schedule scheduling transmission of sounding reference signaling in a first time interval. The first time interval overlaps, in an overlap time interval, with a second time interval, for which physical channel signaling is scheduled. Transmitting signaling comprises transmitting, in the overlap time interval, the physical channel signaling omitting the scheduled sounding reference signaling.

Moreover, a user equipment for a radio access network is described. The user equipment is adapted for transmitting signaling based on a sounding reference signaling schedule. The sounding reference signaling schedule schedules transmission of sounding reference signaling in a first time interval. The first time interval overlaps, in an overlap time interval, with a second time interval, for which physical channel signaling is scheduled. Transmitting signaling comprises transmitting, in the overlap time interval, the physical channel signaling omitting the scheduled sounding reference signaling. The user equipment may comprise, and/or be adapted for utilising, processing circuitry and/or radio circuitry, in particular a transmitter and/or transceiver, for such transmitting. Alternatively, or additionally, the user equipment may comprise a transmitting module for such transmitting. The user equipment may comprise, and/or be adapted for utilising, processing circuitry and/or radio circuitry, in particular a transceiver and/or receiver, and/or a receiving module, for receiving the sounding reference signaling schedule, and/or a schedule scheduling the physical channel signaling.

According to the approaches described herein, unwanted collusion or interference of scheduled signaling may be ameliorated or avoided.

A schedule may be considered a configuration and/or indication indicating a time interval and/or frequency interval, respectively time and/or frequency resources, and/or a corresponding resource structure, for signaling. This may be referred to as a schedule scheduling accordingly. A schedule may be configured by control signaling, e.g. transmitted by a network node, in particular a network node receiving and/or targeted by the sounding reference signaling. Scheduling a schedule, or a device, may comprise transmitting corresponding control signaling and/or configuring the device accordingly. A schedule may generally pertain to specific signaling, like sounding reference signaling, and/or a specific channel or specific channels, e.g. a physical channel.

Omitting signaling may comprise not transmitting the signaling, despite it being scheduled according to a corresponding schedule. This may comprise ignoring and/or overriding the schedule. Omitting may generally be performed based on a configuration. Transmitting signaling may comprise transmitting sounding reference signaling in the rest of the first time interval, and/or outside the overlap time interval and/or outside an omitting time interval, if the first time interval is larger than the overlap time interval. In particular, sounding reference signaling may be transmitted in one or more symbols of the first time interval for which no physical channel signaling is scheduled, e.g. pertaining to the same carrier and/or cell and/or subcarrier grouping and/or transmission timing structure. Generally, it may be considered that scheduled sounding reference signaling is partially omitted, e.g. for one or more symbols in the overlap time interval, and/or partially transmitted, for one or more symbol/s in the first time interval, but not in the overlap time interval (or not in an omitting time interval, which may be larger than the overlap time interval, but include it).

The physical channel signaling and/or sounding reference signaling may in some cases be scheduled for transmission in the same direction, for example uplink or sidelink, and/or may be addressed to, and/or target at, and/or intended for, the same receiver, e.g. a network node. However, scenarios with different targets are considered, and/or in which the sounding reference signaling and/or physical channel signaling have multiple targets or a broadcast.

Sounding reference signaling may generally be considered signaling for sounding a channel, and/or associated frequency ranges, e.g. subcarriers and/or physical resource blocks. Sounding reference signaling may in some cases be considered pilot signaling, or in some alternatives SRS. Sounding reference signaling may be transmitted in uplink or sidelink. The sounding reference signaling may generally be signaling transmitted with defined (e.g., predefined and/or or configured) characteristics, enabling the receiving node (e.g., network node) to e.g. determine or estimate channel quality and/or signal strength and/or power level and/or interference and/or noise. Sounding in the context of this disclosure may be considered to pertain to transmitting reference signaling, in particular SRS, to allow channel estimation of associated frequency resources or range/s.

Physical channel signaling may generally pertain to a specific channel, e.g. one (or more) of a shared channel or a dedicated channel, PUCCH, PSSCH, PUSCH, PSSCH, a control channel, a data channel, a low latency channel, or similar. It this context, it should be noted that the sounding reference signaling may be considered to not pertain to a specific channel, and/or at least to be associated to a different channel than the physical channel signaling. In particular, the physical channel signaling may pertain to signaling scheduled for a mini-slot, and/or to short PUCCH signaling or short PUSCH signaling.

The physical channel signaling and the sounding reference signaling may be scheduled for the same cell and/or carrier, and/or subcarrier grouping. In such cases, it is particularly useful to avoid collision or interference.

A time interval for which transmission of signaling is scheduled, e.g. the first and/or second time interval, may pertain to, and/or be included in, a transmission timing structure, in particular in a specific structure, for example a slot or subframe or mini-slot. The first time interval and the second time interval may be in the same transmission timing structure, respectively in the same corresponding part of a timing grid. For example, the first and second time interval may be in the same structure or slot. However, cases in which at least part of the interval or intervals cross structure or slot borders may be considered. The time intervals may be scheduled for different structures, e.g. mini-slot and slot, slot and mini-slot, or mini-slot and mini-slot. It should be noted that mini-slots may be scheduled inside a grid structure defined by a larger transmission timing structure, e.g. based on slots.

Overlapping of time intervals may comprise that the intervals at least partly overlap, and/or comprise at least one common symbol time interval, and/or that at least one border of one time interval is inside of the other time interval and not identical to a border thereof, or that the intervals coincide, e.g. have the same borders in time. Thus, the intervals may be identical, but do not have to be. The time intervals may be arranged relative to an underlying time grid, e.g. based on transmission timing structures, and/or a frame/slot or frame/subframe structure, which may be cell-specific and/or be configured and/or provided by the network, in particular a network node. Time intervals referred to in here may be considered to be continuous, e.g. without interruption or holes, and/or each symbol in the time interval neighbouring at least one other symbol in the time interval. Frequencies or associated ranges or intervals may be considered to overlap analogously, e.g. if they comprise at least one common subcarrier.

The first time interval may comprise more than one symbol time interval, in particular 2, 3 or 4, or up to 4 symbol time intervals, respectively corresponding symbols. The length in time of a symbol time interval may depend on numerology. Accordingly, the first time interval may comprise one or more symbols. Alternatively, or additionally, the second time interval may comprise one or more symbols, e.g. dependent on the length of transmission scheduled, and/or on the length of the associated transmission timing structure. For example, if the physical channel signaling is scheduled for a mini-slot, its number of symbols may correspond to the mini-slot length. Signaling scheduled for an interval longer than, and/or comprising more than, one symbol in time, may pertain to the same frequencies or frequency range, e.g., covering the same subcarriers and/or subcarrier groupings, or to different frequencies and/or ranges. For example, sounding reference signaling may be scheduled for different subcarriers or subcarrier groupings, which may be overlapping (without being identical) or not overlapping. It may be considered that the sounding reference signaling is scheduled to be shifted in frequency for each symbol it is scheduled for.

In some variants, the sounding reference signaling schedule may schedule the sounding reference signaling for transmission in a first frequency range, which may be at least partly different from a second frequency range for which the physical channel signaling is scheduled.

Generally, transmitting the scheduled sounding reference signaling is omitted in an omitting time interval comprising the overlap interval, and larger than the overlap interval. In particular, the omitting time interval may include and/or cover the first time interval, e.g. if this is larger than the overlap time interval. This may in particular be the case in which for different symbol time intervals of the first time interval, the sounding reference signaling is scheduled for transmission in the same frequency or frequency range, e.g. the same subcarrier/s and/or subcarrier groupings. The omitting interval may comprise at least one more symbol (and/or be at least one symbol time length longer) than the overlap time interval.

It may be considered that transmitting the scheduled sounding reference signaling is omitted in an omitting time interval based on an omitting configuration and/or one or more operational parameters or conditions. The omitting configuration may be configured to the user equipment, e.g. by the network or a network node. The omitting configuration may provide a set of possible approaches to select the omitting time interval, and/or define one or more omitting time intervals. Operational parameters or conditions may generally pertain to, e.g. distance (e.g., in frequency and/or transmission power level) between the sounding reference signaling and the physical channel signaling, length of the first time interval (e.g., whether it is one symbol time interval in length or longer), the carrier (in particular, the absolute frequency of the carrier, e.g. if it is below a certain frequency threshold), latency requirements, intended reciprocity regarding the sounding reference signaling, transition time between the sounding reference signaling and the physical channel signaling, whether OCC is utilised or not, orthogonality of SRS ports, etc. In particular, a guard period of one or more symbols in which the sounding reference signaling is omitted may be included into the omitting time interval (e.g., added to the overlap time interval). Such may be determined by the UE, or may be configured with an omitting configuration. The omitting time interval may be determined based on the number of symbols in the overlap time interval, and/or the number of symbols in the first time interval not in the overlap time interval, and/or the difference or ratio of these numbers. For example, if the number of symbols of the first time interval not in the overlap time interval is lower than a threshold number (e.g., 2 or 3), the omitting time interval may be determined to include these symbols. An omitting configuration may be configured with a corresponding message, which may be separate from control signaling scheduling the sounding reference signaling and/or the physical channel signaling. For example, the omitting configuration may be configured with higher-layer signaling, e.g. RRC or MAC signaling.

The scheduled sounding reference signaling and the scheduled physical channel signaling may in particular pertain to the same or overlapping (in frequency) carrier or carrier aggregation. In some cases, they may pertain to the same numerology, or to different numerologies.

The sounding reference signaling and the physical channel signaling may be scheduled with different scheduling messages. In particular, the sounding reference signaling may be scheduled with a scheduling assignment and/or an indication for transmission to be received, e.g. in downlink or sidelink. The physical channel signaling may be scheduled for example with an uplink grant or an indication for transmission by the scheduled device, in particular for uplink or sidelink transmission.

The sounding reference signaling may be scheduled for reciprocity signaling. Thus, corresponding communication signaling (to be received by the user equipment) may in general be scheduled or transmitted later in time than the sounding reference signaling, in particular one or more, for example one, two or three symbol time intervals later in time. The timing difference between the signalings may be adapted, and/or be determined or configured, to allow for, and/or may be utilised for, receiving and/or processing, e.g. demodulating/decoding, and/or for adapting the transmission (respectively, its parametrisation) for the communication signaling based on the sounding reference signaling. Thus, the communication signaling may be reciprocal to the reference signaling. The parametrisation, and/or a configuration indicting time resources for the sounding reference signaling and the communication signaling may be determined and/or configured based, and/or to account for, such a timing difference. The communication signaling (to be received) and the sounding reference signaling (to be transmitted) may be configured/scheduled with the same message and/or the same control signaling, e.g. a scheduling assignment. The communication signaling may be seen as reciprocal to the reference signaling. In particular, the reference signaling may be parametrised to (and/or be indicated or selected to) represent the channel conditions/channel quality/channel state for the communication signaling, e.g. to be representative therefor. For example, the frequency resources indicated and/or used for the reference signaling may allow channel estimation of frequency resources indicated and/or used for the communication signaling. In this context, it may be sufficient if the reference signaling covers, in frequency domain, a subset of the communication frequency resources, such that for example for one or more or each subrange of the communication frequency resources, a smaller subrange/subpattern of reference signaling is representative of the channel (e.g., conditions or quality or state). Alternatively, or additionally, the frequency resources for reference signaling may be associated and/or distributed to cover one or more frequency ranges overlapping and/or coinciding with one or more frequency ranges associated to the frequency resources for the communication signaling.

There may generally be considered a method of operating a network node in a radio access network, the method comprising configuring a user equipment with an omitting configuration as described herein. A network node for a radio access network may be considered, the network node being adapted for configuring a user equipment with an omitting configuration as described herein. The network node may comprise, and/or be adapted for utilising, processing circuitry and/or radio circuitry, in particular a transmitter and/or transceiver, and/or a configuring module, for such configuring.

There is also described a program product comprising instructions causing processing circuitry to control and/or perform a method as described herein.

Moreover, a carrier medium arrangement carrying and/or storing a program product as described herein is disclosed.

BRIEF DESCRIPTION OF THE DRAWINGS

The drawings are provided to illustrate concepts and approaches described herein, and are not intended to limit their scope. The drawings comprise.

DETAILED DESCRIPTION

Mobile data traffic is growing exponentially due to the enormous success of smart phones, tablets and other data traffic appliances. The traditional way for increasing the data rate had been to increase the transmission bandwidth. However, the spectrum has become scarce due to the increase in wireless access systems and hence a challenge for future wireless (radio) access systems is to find alternative solutions to meet high demands on the data rate. One way of handling the increased wireless data traffic is to deploy more base stations (BS) and densify the cellular network. This would however increase interference and deployment cost. Another option, seemingly cheaper in terms of deployment cost, for increasing the system capacity is to introduce large antenna arrays at the BS. The BS, having excessive number of antennas, can simultaneously schedule multiple terminals at the same time/frequency resource with simple linear processing such as maximum-ratio transmission (MRT) or zero-forcing (ZF) in the downlink and maximum-ratio combining (MRC) or ZF in the uplink. This is often referred to as very large (VL) multi-user (MU) multiple-input-multiple-output (MIMO), and is abbreviated by VL-MIMO hereafter. VL-MIMO is sometimes also referred to as massive MIMO. In the following, the approaches are described with a focus on NR technology. However, this is by way of example only, and they may be considered in other contexts/RANs as well.

VL-MIMO in particular is dependent on acquiring information about channel quality, e.g. channel state information (CSI). In practice, the approach for NR is to facilitate utilisation of an improved SRS design to acquire reciprocity based channel state information, SRS being a form of sounding reference signaling considered for NR.

SRS may allow single symbol and multi-symbol signaling. A single symbol SRS may span 1 OFDM symbol in time, and in frequency a certain bandwidth (frequency range, or subcarrier grouping). This type of SRS may be particularly useful for UEs with good power budget and/or narrow sounding bandwidth.

Figure 1:
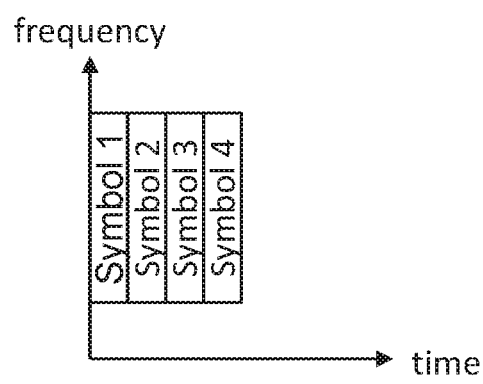
FIG. 1, schematically showing exemplary sounding reference signaling schedules.
Figure 1:
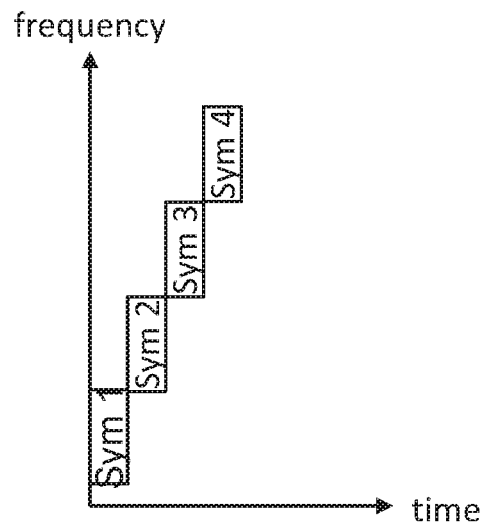

In addition, NR also introduces multi-symbol SRS. Here, one SRS signaling consists of multiple symbols. Each symbol can either sound the same, or different bandwidths (ranges in frequency), as shown in FIGS. 1a and 1b, respectively. Sounding the same bandwidth multiple times improves estimation quality at the receiver, e.g. an eNB or gNB, e.g. for UEs with poor power budget. Sounding different bandwidths in different symbols helps to increase the total sounding bandwidth, which may for example be useful if the eNB or gNB (generally, the network node) plans to schedule a wide bandwidth downlink, but the UE only has power to sound a fraction of the total downlink bandwidth. The downlink bandwidth may be scheduled for communication signaling reciprocal to the SRS. FIG. 1 schematically shows multi-symbol SRS schedules. In FIG. 1a), all symbols sound the same bandwidth, respectively are scheduled for the same frequency resources. In FIG. 1b), different bandwidth parts are sounded in different symbols. All symbols shown in this case are associated to the same slot interval.

If the same bandwidth is sounded in each symbol, it can be considered to apply time-domain orthogonal cover codes (OCC) to enable multiplexing multiple SRS on the same time-frequency resources.

In some situations, a UE may be scheduled to transmit SRS plus another physical channel/signal simultaneously (in the same slot or in an overlap time interval). For example, NR defines a short PUCCH signaling, which may span one or two OFDM symbols in time (which may correspond to a mini-slot transmission). Especially if the SRS has been configured periodically, it may happen that SRS and short PUCCH need to be transmitted in the same symbol(s). Should they also overlap in frequency, one of the channels/signals needs to be dropped (omitted), based on priority typically the SRS would be dropped.

If SRS and short PUCCH don't overlap in frequency, they can be transmitted simultaneously. However, if there is a large separation in frequency between them, intermodulation products can occur potentially resulting in power backoff of many dB. Some short PUCCH waveforms are furthermore of low peak to average power ratio (PAPR) or cubic metric (CM). SRS is also of low PAPR/CM. A superposition of SRS and PUCCH waveforms, however, increases PAPR/CM, which can also lead to power backoff. Similar problems may occur for example with short PUSCH or other mini-slot transmission, or more generally, if SRS and other signaling are overlapping in time.

As SRS may be very important for reciprocity-based downlink transmission in NR, SRS dropping has a negative impact on downlink throughput.

NR defines multi-symbol SRS. In case SRS and another physical channel/signal (e.g. short PUCCH, PUSCH) are transmitted simultaneously, e.g. in an overlap time interval, it might be that only one or few symbols overlap, while during the remaining symbols the UE is only scheduled to transmit SRS. In particular in such situations, SRS may be partially dropped, e.g. such that SRS is omitted in those symbols where the UE transmits another physical channel/signal, but to transmit SRS in the other symbols.

FIGS. 1 to 4 exemplary show SRS signaling scheduled for a first time interval covering 4 symbols in time. The symbols are numbered 1 to 4 for ease of reference. However, they may or may not have a corresponding number within a transmission timing structure like a slot (e.g., numbered 0 to 6 or 0 to 13, number 1 of the SRS may coincide with number 1 of the slot, but does not necessarily have to). However, different time interval lengths may be considered. Analogously, the physical channel signaling (indicated "Other"), which exemplarily covers 2 symbols in time, may have a different second time interval length scheduled.

Accordingly, the channel can be more frequently sounded compared to the case if the complete SRS is dropped. This improves sounding quality and downlink throughput in particular for reciprocity-based downlink transmissions.

Figure 2:
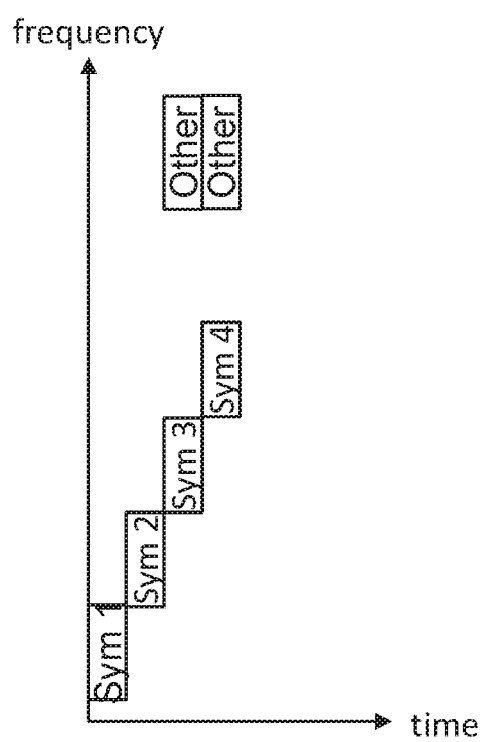
FIG. 2, schematically showing schedules scheduling sounding reference signaling and physical channel signaling with an overlap time interval.
Figure 3:
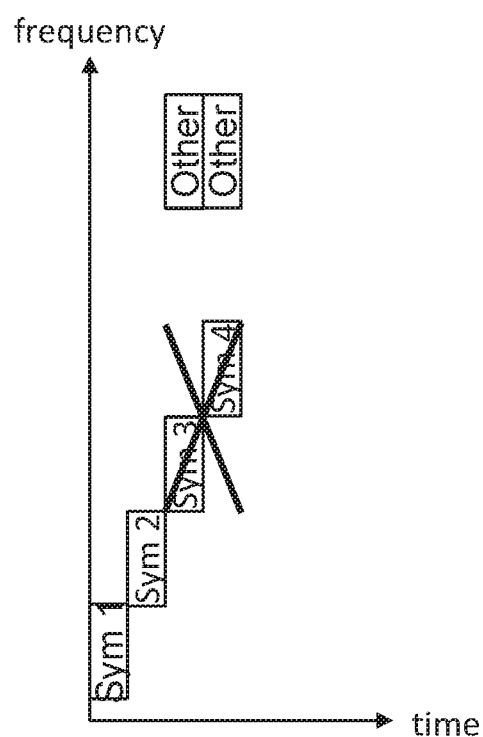
FIG. 3, schematically showing omitting of sounding reference signaling.

FIG. 2 shows a case in which SRS and another physical channel signaling ("Other") partly overlap in time. Instead of transmitting both physical channel signaling and SRS, or dropping SRS completely, it is proposed to omit SRS transmission only in these symbols where SRS and the other physical channel signaling overlap. In this case, the corresponding overlap time interval comprises the last two OFDM symbols, symbols 3 and 4, as shown in FIG. 3. The first two symbols (symbols 1 and 2) of the multi-symbol SRS are still transmitted. In case the transition from SRS to the other physical channel/signal leads to a transient period due to power/phase/frequency allocation change, it can be considered to drop an extra SRS symbol to enable a guard period.

Figure 4:
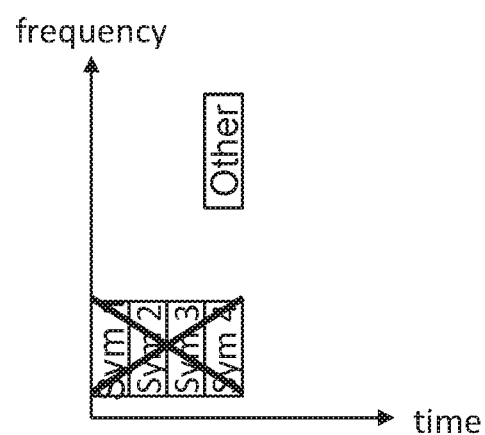
FIG. 4, schematically showing another variant of omitting sounding reference signaling.

In particular, FIG. 2 shows a multi-symbol SRS and another physical channel/signal that partly overlap in time in overlap time interval consisting of symbols 3 and 4. FIG. 3 shows a multi-symbol SRS and another physical channel/signal partly overlapping in time with SRS being omitted or dropped in the overlapping symbols. In FIGS. 2 and 3, the multi-symbol SRS are intended to sound a different bandwidth (frequency range) in different symbols. In FIG. 4, a multi-symbol SRS is shown that sounds in each symbol of the scheduled first time interval the same bandwidth. Here, it may be considered to drop the complete SRS, especially if a time-domain OCC is applied to enable multiplexing with other users, since dropping of symbols may destroy orthogonality. Also, in case that multiple symbols are used to improve estimation quality at network node, it can be considered to drop the complete SRS. In the latter case, it can be considered to drop the complete SRS if the overlap is large, but otherwise to transmit the remaining SRS symbols (if only one or few symbols needs to be dropped, the energy contained in the remaining symbols may still be sufficient for a good enough estimate). Completely dropping SRS may be seen as an example of determining an omitting time interval covering the whole first time interval.

In particular, FIG. 4 shows multi-symbol SRS, for which the same bandwidth is scheduled to be sounded in each symbol. The complete SRS is dropped, despite the overlap time interval covering only one symbol.

The use equipment may be configured with an omitting configuration, e.g. as part of a SRS configuration, to configure the dropping/omitting behavior in case of overlap with physical channel signaling scheduled for transmission by the same UE. Possible configurations or rules, one or more of which may be configured (e.g., more than one to define a set from which the UE may select, e.g. based on an indicator, or to combine a set of rules that complement each other, which may be considered a configuration in itself), comprise 1. Always drop complete SRS
2. Only drop SRS in symbols overlapping physical channel signaling
3. Drop complete SRS if each symbol sounds same bandwidth/frequency range
4. Drop complete SRS if each symbol sounds same bandwidth/frequency range, and the overlap time interval covers more than X symbols (X is the symbol threshold) in time
5. Drop complete SRS if each symbol sounds same bandwidth/frequency range and a time-domain OCC is applied
6. Drop complete SRS if the distance in frequency-domain to another physical channel/signal is larger than a threshold (e.g., accommodating for intermodulation products becoming worse with increasing frequency-domain separation)

7. Only drop SRS in symbols overlapping (in the overlap time interval) if the distance in frequency-domain to the physical channel signaling is larger than a threshold 8. Drop a subset of the SRS ports if each symbol sounds the same bandwidth and a time-domain OCC is applied 9. Only drop SRS symbols in the overlap time interval depending on the information conveyed by the other physical channel signaling, and/or based on the channel or channel type. For example, if the physical channel is an uplink control channel, and it carries feedback signaling like ACK/NACK in response to a downlink transmission, drop the SRS symbols in the overlapping region. If the control channel carriers a CSI report, then partial dropping can be avoided.

A UE could be configured with one or multiple behaviors. For example, a UE could be configured with 2 of the above. Alternatively, a UE could be configured with multiple configurations (e.g. both 1 and 2 above) and an indicator in control signaling, e.g. in DCI, may be used to select which configuration should be applied.

Having a UE configured with multiple configurations, and dynamically selecting which configuration may be utilised for aperiodic triggered SRS, e.g. by utilising an activation command (e.g., an indicator), which can be sent together with the indicator which SRS behavior to select.

For periodic SRS, it may be preferable to configure a UE with one configuration. This configuration can depend on the type of overlapping physical channel signaling. If a UE is configured with multiple SRS resources, each resource can have its own configuration.

Partial port dropping in case of time-domain OCC is discussed exemplarily. In the case a time-domain OCC is used for port orthogonalisation, some of the ports can be dropped to maintain orthogonality for the remaining ports. For example, in a 4 OFDM SRS resource, a UE (or a set of UEs) can be assigned 4 different OCCs, for example, OCC0=[1 1 1 1], OCC1=[1 1−1−1], OCC2=[1−1 1−1] and OCC3=[1−1−1 1]. Then, in case the two last OFDM symbols (or one symbol) is dropped, some of the ports lose orthogonality, as OCC0=[1 1 x x], OCC1=[1 1 x x], OCC2=[1−1 x x] and OCC3=[1 −1 x x] result. In this case, for some embodiments, only some of the ports may be removed or dropped, e.g. OCC1 and OCC3 may be muted (i.e. corresponding SRS are not transmitted), while OCC0 and OCC2 are kept as they are still orthogonal (corresponding SRS can be transmitted in the non-dropped symbols). In some embodiments, when a user is assigned both an unmuted and a muted SRS port, the power may be redistributed, for example the power may be increased on the unmuted SRS ports.

It can also be considered that, if a UE needs to drop some SRS symbols, it may, e.g. based on some rule, use some/all of the remaining OCC sequences, e.g. for redistribution to some SRS ports.

If in above example, only the last OFDM symbol needs to be dropped, and the SRS can be transmitted on the remaining 3 OFDM symbols, 3 OCC sequences can be derived from a DFT(3) matrix. These OCC sequences are different from (and not orthogonal to) the original OCC sequences. In such a case, the UE could derive new OCC sequences based on the number of remaining SRS symbols, and assign the OCC sequences to SRS ports and transmit at least some of the corresponding SRS. The network, in particular a network node like an eNB or a gNB, may be adapted for configuring (and/or may configure) how many and/or which OCC sequences a UE should generate and transmit SRS based on the number of remaining SRS symbols. The corresponding information may be considered represented by an omitting configuration, and/or such configuring may be considered configuring a user equipment with an omitting configuration.

Figure 5:
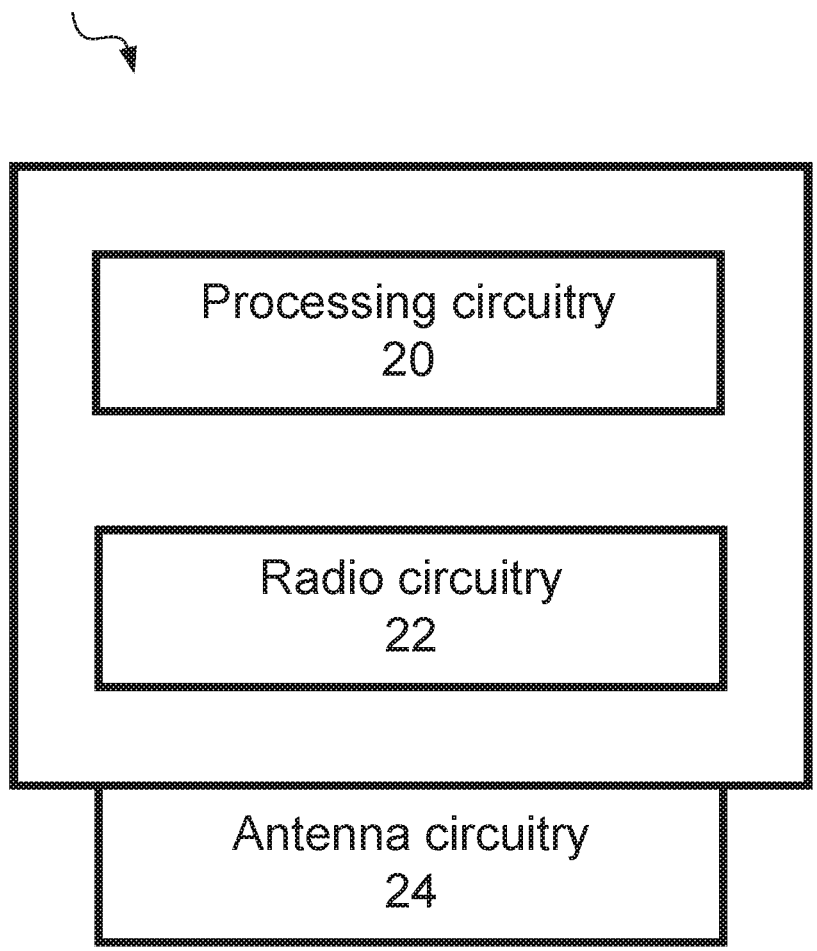
FIG. 5, schematically showing an exemplary radio node implemented as a user equipment.

FIG. 5 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry and/or radio circuitry, and/or modules, for example stored in memory.

Figure 6:
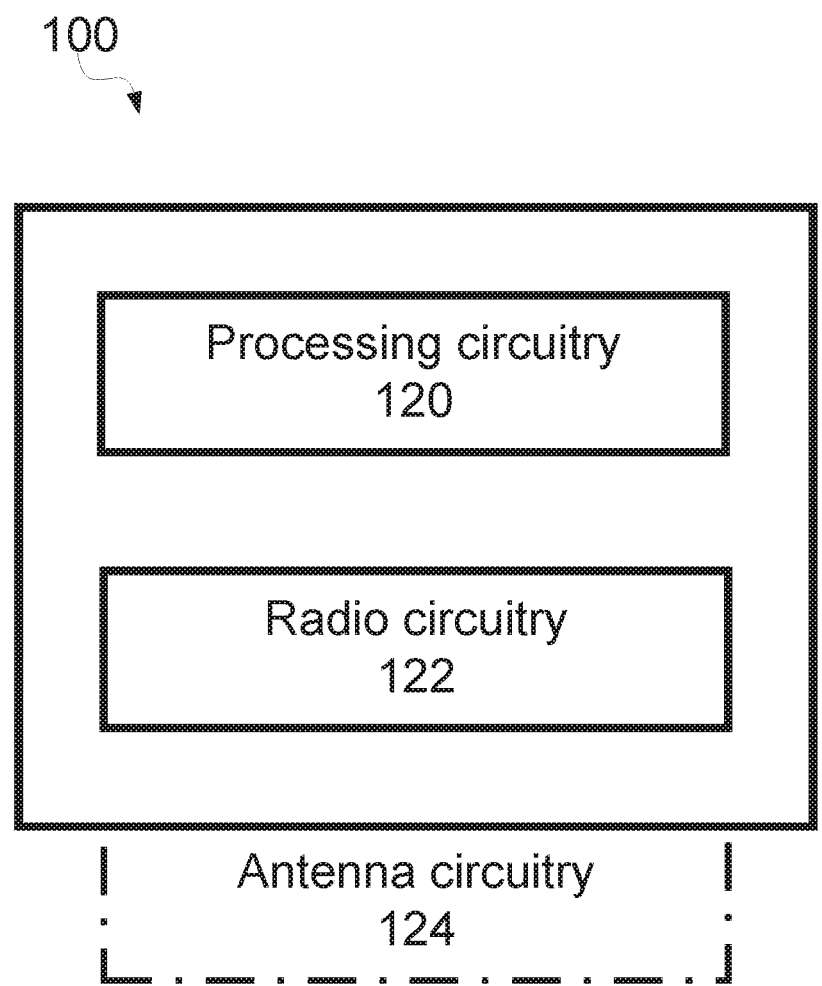
FIG. 6, schematically showing an exemplary radio node implemented as a network node.

FIG. 6 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry and/or radio circuitry, and/or modules, which may be stored in memory. The radio node 100 may generally comprise communication circuitry, e.g. for communication with another network node, like a radio node, and/or with a core network.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or formats for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing intervals like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgement information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ARQ Automatic Repeat reQuest
CBG Code Block Group
CDM Code Division Multiplex
CM Cubic metric
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DMRS Demodulation reference signal
FDM Frequency Division Multiplex
HARQ Hybrid Automatic Repeat Request
MCS Modulation and Coding Scheme
MIMO Multiple-input-multiple-output
MRC Maximum-Ratio Combining
MRT Maximum-Ratio Transmission
MU-MIMO Multiuser multiple-input-multiple-output
OCC Orthogonal Cover Code
OFDM/A Orthogonal Frequency Division Multiplex/Multiple Access
PAPR Peak to Average Power Ratio
PDCCH Physical Downlink Control Channel
PDSCH Physical Downlink Shared Channel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TDM Time Division Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3GPP usage if applicable.

What is claimed is:

1. A method of operating a user equipment in a New Radio (NR) radio access network, the method comprising:
receiving control signaling that schedules sounding reference signaling and physical channel signaling to be transmitted by the user equipment on the same carrier and in the same slot as one another, the sounding reference signaling and the physical channel signaling being scheduled for transmission in respective first and second time intervals that are in the slot and that overlap in time in an overlap time interval, wherein the first time interval has a duration of 2 or 4 symbol time intervals, wherein the physical channel signaling is physical channel signaling on a Physical Uplink Control Channel (PUCCH); and based on scheduling of the sounding reference signaling according to the control signaling, transmitting signaling such that, in the overlap time interval, the physical channel signaling is transmitted omitting the scheduled sounding reference signaling, and wherein the signaling is transmitted such that sounding reference signaling scheduled for a part of the first time interval not overlapping with the second time interval is transmitted on the same carrier as the physical channel signaling.

2. The method according to claim 1, wherein the signaling comprises the sounding reference signaling and the physical channel signaling.

3. The method according to claim 1, wherein the first time interval and the second time interval have at least one common symbol time interval and/or only partially overlap.

4. The method according to claim 1, wherein the first time interval and the second time interval are not identical.

5. The method according to claim 1, wherein the sounding reference signaling and the physical channel signaling are scheduled with different scheduling messages.

6. The method according to claim 1, wherein the physical channel signaling corresponds to a short PUCCH transmission spanning one or two symbol time intervals.

7. The method according to claim 1, wherein the signaling is Single Carrier-Frequency Domain Multiplex signaling.

8. The method according to claim 1, wherein the sounding reference signaling is transmitted on multiple symbols in the first time interval, and wherein the sounding reference signaling sounds the same frequency range in all of the symbols on which sounding reference signaling is transmitted.

9. A user equipment for a New Radio (NR) radio access network, the user equipment comprising processing circuitry and radio circuitry and being configured to utilize the processing circuitry and radio circuitry to:

receive control signaling that schedules sounding reference signaling and physical channel signaling to be transmitted by the user equipment on the same carrier and in the same slot as one another, the sounding reference signaling and the physical channel signaling being scheduled for transmission in respective first and second time intervals that are in the slot and that overlap in time in an overlap time interval, wherein the first time interval has a duration of 2 or 4 symbol time intervals, wherein the physical channel signaling is physical channel signaling on a Physical Uplink Control Channel (PUCCH); and based on scheduling of the sounding reference signaling according to the control signaling, transmit signaling such that, in the overlap time interval, the physical channel signaling is transmitted omitting the scheduled sounding reference signaling, and wherein the signaling is transmitted such that sounding reference signaling scheduled for a part of the first time interval not overlapping with the second time interval is transmitted on the same carrier as the physical channel signaling.

10. The user equipment according to claim 9, wherein the signaling comprises the sounding reference signaling and the physical channel signaling.

11. The user equipment according to claim 9, wherein the first time interval and the second time interval have at least one common symbol time interval and/or only partially overlap.

12. The user equipment according to claim 9, wherein the first time interval and the second time interval are not identical.

13. The user equipment according to claim 9, wherein the sounding reference signaling and the physical channel signaling are scheduled with different scheduling messages.

14. The user equipment according to claim 9, wherein the physical channel signaling corresponds to a short PUCCH transmission spanning one or two symbol time intervals.

15. The user equipment according to claim 9, wherein the signaling is Single Carrier-Frequency Domain Multiplex signaling.

16. The user equipment according to claim 9, wherein the sounding reference signaling is transmitted on multiple symbols in the first time interval, and wherein the sounding reference signaling sounds the same frequency range in all of the symbols on which sounding reference signaling is transmitted.

* * * * *